(12) United States Patent
Boss et al.

(10) Patent No.: US 9,365,239 B2
(45) Date of Patent: Jun. 14, 2016

(54) CRAWLER-TYPE VEHICLE

(71) Applicant: ZF Friedrichshafen AG, Friedrichshafen (DE)

(72) Inventors: Ralf Boss, Kressbronn (DE); Bernd Unseld, Ravensburg (DE); Achim Klumpp, Bergatreute (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 0 days.

(21) Appl. No.: 14/426,225

(22) PCT Filed: Aug. 5, 2013

(86) PCT No.: PCT/EP2013/066355
§ 371 (c)(1),
(2) Date: Mar. 5, 2015

(87) PCT Pub. No.: WO2014/044457
PCT Pub. Date: Mar. 27, 2014

(65) Prior Publication Data
US 2015/0217806 A1 Aug. 6, 2015

(30) Foreign Application Priority Data
Sep. 18, 2012 (DE) .......................... 10 2012 216 661

(51) Int. Cl.
*B62D 55/06* (2006.01)
*B62D 11/18* (2006.01)

(52) U.S. Cl.
CPC .............. *B62D 11/18* (2013.01); *B62D 55/06* (2013.01)

(58) Field of Classification Search
CPC ................................. B62D 11/18; B62D 55/06
See application file for complete search history.

(56) References Cited

U.S. PATENT DOCUMENTS

| | | | | |
|---|---|---|---|---|
| 2,336,911 | A * | 12/1943 | Zimmermann | ...... B62D 11/183 180/6.44 |
| 2,336,912 | A * | 12/1943 | Zimmermann | ...... B62D 11/183 180/6.44 |
| 2,393,557 | A | 1/1946 | Orshansky, Jr. | |
| 2,780,299 | A * | 2/1957 | Matson | .................... B62D 7/00 180/6.28 |
| 4,882,947 | A | 11/1989 | Barnard | |

(Continued)

FOREIGN PATENT DOCUMENTS

| | | |
|---|---|---|
| DE | 38 35 752 A1 | 4/1990 |
| DE | 41 12 982 A1 | 10/1992 |

(Continued)

OTHER PUBLICATIONS

German Search Report Corresponding to 10 2012 216 661.0 mailed May 21, 2013.

(Continued)

*Primary Examiner* — Kevin Hurley
(74) *Attorney, Agent, or Firm* — Davis & Bujold PLLC; Michael J. Bujold

(57) ABSTRACT

A tracked vehicle (5) with a drive engine (1) for providing mechanical drive power, with a gearshift transmission (2) coupled to the drive engine (1) and with at least one steering gear system (6) coupled to the final drives (12, 12A) of each track (10, 10A). At least one pump (3) supplies hydraulic power to at least one hydraulic motor (4, 4A) of the steering gear system (6). The drive engine (1), the gearshift transmission (2) and the pump (3) are arranged as a drive unit (16) separately from the steering gear system (6).

9 Claims, 1 Drawing Sheet

(56) References Cited

U.S. PATENT DOCUMENTS

| | | | |
|---|---|---|---|
| 5,004,060 A | 4/1991 | Barbagli et al. | |
| 5,139,465 A | * 8/1992 | Sato | B62D 11/18 |
| | | | 475/24 |
| 5,473,541 A | * 12/1995 | Ishino | B62D 11/183 |
| | | | 180/6.7 |
| 5,545,098 A | 8/1996 | Zulu | |

FOREIGN PATENT DOCUMENTS

| | | |
|---|---|---|
| DE | 42 30 534 A1 | 4/1993 |
| DE | 196 14 581 A1 | 10/1996 |
| DE | 196 46 344 A1 | 5/1998 |
| WO | 2011/003214 A1 | 1/2011 |

OTHER PUBLICATIONS

International Search Report Corresponding to PCT/EP2013/066355 mailed Nov. 7, 2013.

Written Opinion Corresponding to PCT/EP2013/066355 mailed Nov. 7, 2013.

* cited by examiner

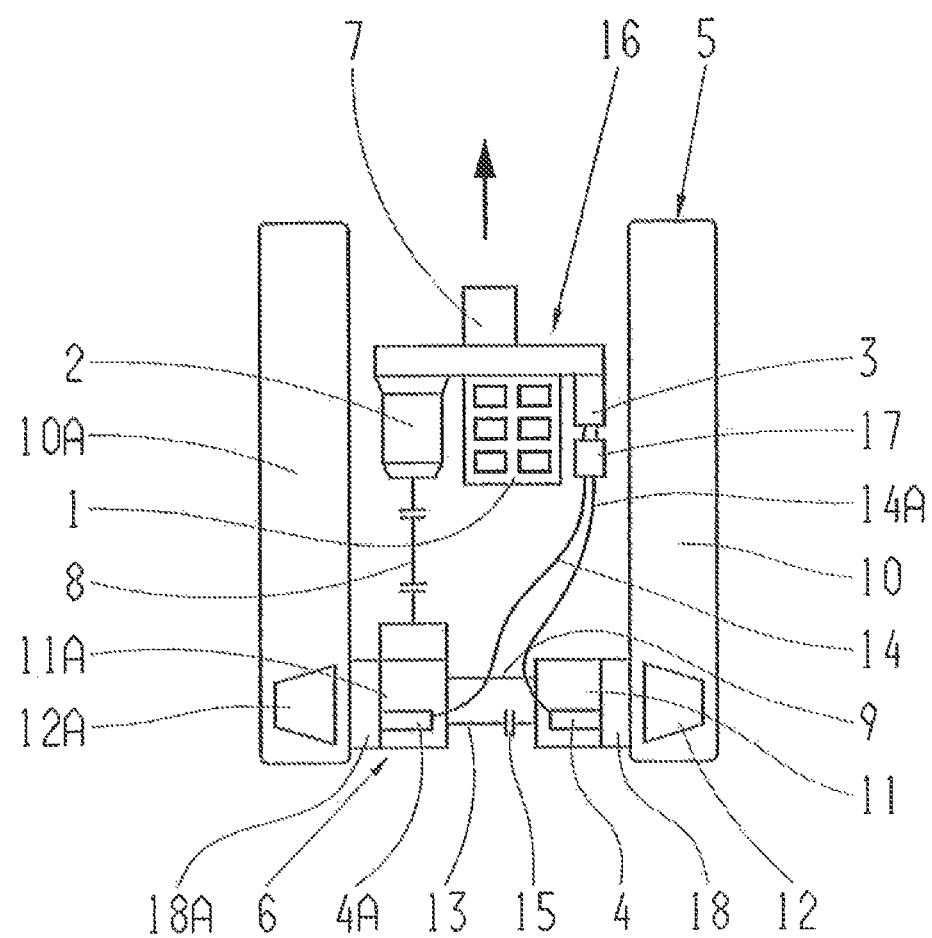

CRAWLER-TYPE VEHICLE

This application is a National Stage completion of PCT/EP2013/066355 filed Aug. 5, 2013, which claims priority from German patent application serial no. 10 2012 216 661.0 filed Sep. 18, 2012.

FIELD OF THE INVENTION

The present invention concerns a crawler-type vehicle with a drive unit and with a steering gear mechanism.

BACKGROUND OF THE INVENTION

For example, from the document DE 42 30 534 A1 a drive unit for a vehicle steered by speed difference is known, with running gear mechanisms that roll on a supporting surface, in particular caterpillar or track mechanisms. The vehicle comprises a drive engine which powers a branching or connecting transmission, this in turn driving a gearshift transmission and the two auxiliary drives. The two guide rollers of the caterpillar or track mechanisms are driven by the transmission output of the gearshift transmission. In addition, associated with each track mechanism there is a summation gear system as a steering gear. In the known drive unit the drive engine with the transmission components, which consist of the branching transmission for branching the drive input for the auxiliary transmissions, the gearshift transmission, the output of the main transmission and the summation gears, are all combined in one block. Thus, a so-termed power-pack is formed, which consists of the engine, the transmission and the steering gear. The concentrated mass density of the power-pack disadvantageously displaces the center of gravity of the vehicle when it is fitted at the rear or at the front of the vehicle. Furthermore, a power-pack fitted at the rear impedes access of the vehicle's crew from the rear. If the power-pack is fitted at the front of the vehicle, the final drive of the tracks is usually also at the front and therefore has an adverse effect on the loading of the tracks and on the track wear.

SUMMARY OF THE INVENTION

The purpose of the present invention is to propose a tracked vehicle of the type described to begin with, which enables an optimized weight distribution with as compact as possible a structure and in which the circulating power flows to the immediate vicinity of the final drives by way of as few and as efficient transmission assemblies as possible.

According to the invention this objective is achieved by the characteristics specified in the description below and advantageous design features also emerge from the description and the drawing.

A tracked vehicle is proposed, which has a mechanical drive engine and at least one pump for the supply of hydraulic power to at least one hydraulic motor, wherein the drive engine is coupled to a gearshift transmission and at least one steering gear system is provided, which is coupled to the final drives of each track. According to the invention, the drive engine, the gearshift transmission and the pump form a drive unit which is arranged spatially separate from the steering gear system. By virtue of the detached configuration of the known steering shift gear system, degrees of freedom are made available in relation to the balancing of the drive and transmission components provided in the proposed tracked vehicle, particularly also in the case of amphibious vehicles. In that the steering gear system is associated with the track drive, depending on whether a rear-mounted or front-mounted track drive is provided, the drive unit with the gearshift transmission can then be fitted at the front or at the rear in order to equalize the weight and to ensure an optimum weight distribution in the vehicle.

In an advantageous embodiment variant it can be provided that the steering gear system with its summation gears associated with each of the final drives is arranged at the rear on the tracked vehicle, and the drive unit in the case of a rear-mounted drive is positioned either centrally in the driving direction or nearer the front on the tracked vehicle, so that despite the rear track drive which is advantageous in relation to track loading and track wear, the crew can mount in a protected manner from behind or from the rear, as is desired in the case of an armored personnel carrier.

With the separate arrangement of the steering gear system at the rear of the tracked vehicle, the central shaft that connects the two summation gears and the zero shaft that connects the two hydraulic motors can be arranged particularly advantageously at as low a level as possible, especially in a tracked vehicle in the form of an armored personnel carrier, thus facilitating access from the rear. For example, the summation gears provided can be associated with one or more steering gear systems or incorporated therein.

A further advantage of the separate arrangement of the drive unit and the steering gears close to the final drive is obtained in that the transmission of driving and steering power from the drive unit does not take place by way of additional angular gears, but directly by means of a drive output shaft to a central shaft of the steering gear system, the said central shaft being connected to the summation gears of the steering gear system. This type of arrangement according to the invention results in a low-loss reactive power flow, since the reactive power flow circulates exclusively by way of the spur gear stages in the steering gear system and not by way of angular gears. Moreover, the arrangement described gives a compact structure since no oversized assemblies are needed. Accordingly, the tracked vehicle according to the invention has a larger transport volume.

Furthermore, thanks to separation of the driving and gear-change transmission from the steering gear no individual, costly steering gearshift transmission is needed, but rather, inexpensive components from other utility vehicles can be used advantageously.

For example, to enable a controlled track speed in the case of amphibian tracked vehicles coming in to land, in the tracked vehicle according to the invention a separable zero shaft can be provided, so that the track rotational speed can be adjusted by means of the two steering motors or hydraulic motors independently of the drive engine, for example when landing after approaching through the water. The separable zero shaft for hydraulic driving independently of the mechanical drive system can be produced, for example, by using a shifting element such as a clutch or the like. However, to carry out steering movements with the tracked vehicle, only one hydraulic motor associated with the zero shaft is needed.

Moreover, the tracked vehicle according to the invention has the further advantage that, as may be necessary, several auxiliary power take-off points can be provided on the drive unit without problems, for example by using an end-connector gear system. For example, power take-offs for auxiliary consumers such as steering pumps, ventilator drives, electric generators or the like can be provided.

BRIEF DESCRIPTION OF THE DRAWING

Below, the present invention is explained in more detail with reference to sole drawing. The sole FIGURE in the drawing shows a possible embodiment variant of a tracked vehicle 5 according to the invention with a detached configuration between the drive unit 16 and the steering gear system 6.

DETAILED DESCRIPTION OF THE PREFERRED EMBODIMENTS

In the embodiment variant shown as an example, the drive unit 16 comprises a drive engine 1 as the mechanical drive input, a gearshift transmission 2 coupled with the drive engine 1, and a hydraulic pump or adjustable pump 3 for the supply of hydraulic power to at least one hydraulic motor 4, 4A, with the drive unit 16 positioned approximately centrally in the tracked vehicle 5. The forward driving direction of the tracked vehicle 5 is indicated by an arrow, to enable the front side of the tracked vehicle to be distinguished from its rear side. In the tracked vehicle 5 according to the invention, the steering gear system 6 for rear-side track driving, located at the rear of the tracked vehicle 5, is arranged spatially separated from the drive unit 16. In addition, at least one auxiliary power take-off 7 is provided on the drive engine 1.

As a mechanical connection between centrally positioned drive unit 16 and the steering gear system 6, a drive output shaft 8 of the gearshift transmission 2 is connected directly to a central shaft 9 of the steering gear system 6. The steering gear system 6 comprises as its final drive for each track 10, 10A in each case a summation gear system 11, 11A, each of these being in the form of a planetary gearset. Each ring gear of the summation gear systems 11, 11A is connected to the central shaft 9, so that the two summation gear systems 11, 11A are acted upon with the same rotational speed by the central shaft 9. As the drive output, each planetary gear carrier of the summation gear systems 11, 11A is connected to the final drive 12, 12A of the associated track 10, 10A. Each sun gear of the summation gear systems 11, 11A is connected by way of a zero shaft 13 to an associated hydraulic motor 4, 4A, and between one of the sun gears and the zero shaft 13 an intermediate gearwheel for reversing the rotational direction is arranged, so that to steer the tracked vehicle 5 a predetermined rotational speed is imparted to the sun gears by means of at least one hydraulic motor 4, 4A. When a straight start path with no steering movements is desired, the sun gears are held fixed by the zero shaft 13 so that the mechanical drive power is transmitted to the final drives 12, 12A by way of the central shaft 9 and the planetary gear carriers or carriers of the summation gear systems 11, 11A. Between the summation gear systems 11, 11A and the final drives 12, 12A there is provided in each case a service and parking brake 18, 18A of the tracked vehicle 5.

The hydraulic motors 4, 4A provided are connected by way of hydraulic lines 14, 14A to one or more adjustable pumps 3 for the supply of hydraulic power, whereas in the FIGURE, for example, a hydraulic distributor 17 is interposed. In a version with two separate hydraulic pumps, each for operating one of the two hydraulic motors 4, 4A, no hydraulic distributor is needed. The hydraulic pump 3 or pumps can also be termed steering pumps, since they supply the hydraulic energy required for steering the tracked vehicle.

The zero shaft 13 is made so that it can be separated by means of a clutch 15. When, as in the embodiment variant considered, a hydraulic motor 4, 4A is associated with each of the summation gear systems 11, 11A, then by separating or partitioning the zero shaft 13 by activating the clutch 15, the tracked vehicle 5 can be driven purely by hydraulic power independently of the drive engine 1.

In the embodiment variant illustrated in the FIGURE a rear-side track drive is provided, in which the central shaft 9 and the zero shaft 13 are arranged at as low a level as possible to allow entry from behind or from the rear, as is necessary in the case of an armored personnel carrier.

INDEXES

1 Drive engine
2 Driving or gearshift transmission
3 Hydraulic pump or adjustable pump
4, 4A Hydraulic motor
5 Tracked vehicle
6 Steering gear system
7 Auxiliary power take-off
8 Drive output shaft
9 Central shaft
10, 10A Track
11, 11A Summation gear system
12, 12A Final drive
13 Zero shaft
14, 14A Hydraulic line
15 Clutch
16 Drive unit
17 Distributor
18, 18A Service and parking brake

The invention claimed is:

1. A tracked vehicle (5) with a drive engine (1) for providing mechanical drive power,
   a gearshift transmission (2) coupled to the drive engine (1),
   at least one steering gear system (6) coupled to a final drive (12, 12A) of at least one track (10, 10A),
   at least one pump (3) for supplying hydraulic power to at least one hydraulic motor (4, 4A) of the steering gear system (6), and
   the drive engine (1), the gearshift transmission (2) and the pump (3) being arranged as a drive unit (16) separately from the steering gear system (6);
   wherein the at least one steering gear system (6) has a summation gear system (11, 11A) coupled to the final drive of the pt least one track (10, 10A);
   the summation gear system (11, 11A) is arranged on the tracked vehicle (5) adjacent a rear portion thereof; and
   the summation gear system (11, 11A) is a planetary gearset such that a ring gear of the planetary gearset is connected to a central shaft (9) of the steering gear system (6), a planetary carrier of the planetary gearset is connected to the final drive of the at least one track (10, 10A), and a sun gear of the planetary gearset is connected, by way of a zero shaft (13), to the at least one hydraulic motor (4, 4A), and an intermediate gearwheel is provided between the sun gear and the zero shaft (13) for reversing a rotational direction of the tracked vehicle (5).

2. The tracked vehicle according to claim 1, wherein the drive unit (16), with a rear-side drive output, is either arranged centrally or adjacent a front relative to a forward driving direction of the tracked vehicle.

3. The tracked vehicle according to claim 1, wherein the gearshift transmission (2) is connected by way of a drive output shaft (8) to the central shaft (9) for transmitting the mechanical drive power, and the pump (3) is connected either directly or indirectly to the at least one hydraulic motor (4, 4A) for transmitting the hydraulic power.

4. The tracked vehicle according to claim 1, wherein the central shaft (9) and the zero shaft (13) are arranged at a relatively low level.

5. The tracked vehicle according to claim 1, wherein the zero shaft is a separable zero shaft (13) provided for enabling hydraulic driving independently of the mechanical drive system.

6. The tracked vehicle according to claim 1, wherein the drive unit (16) has at least one auxiliary power take-off.

7. A tracked vehicle comprising:
a drive unit having a drive engine, a gearshift transmission and a pump, the drive engine being coupled to the gearshift transmission and providing the gearshift transmission with drive power, and the gearshift transmission comprising an output shaft;
first and second tracks, the first track being connected to a first final drive and the second track being connected to a second final drive, each of the first and the second final drives being coupled to a central shaft which is driven by the output shaft of the gearshift transmission;
a steering gear system having first and second hydraulic motors, each of the first and the second hydraulic motors being hydraulically connected to the pump of the drive unit to facilitate supplying hydraulic power thereto, the first hydraulic motor is drivingly connected to the first final drive and the second hydraulic motor is drivingly connected to the second final drive; and
the drive engine, the gearshift transmission and the pump being arranged at one of a leading end and a trailing end of the tracked vehicle, relative to a forward drive direction of the tracked vehicle, and the steering gear system being arranged at another of the leading end and the trailing end of the tracked vehicle relative to the forward drive direction of the tracked vehicle;
wherein the steering gear system has a first summation gear system coupled to the first final drive and a second summation gear system coupled to the second final drive;
the first summation gear system comprises a first planetary gearset in which that a ring gear of the first planetary gearset is connected to the central shaft of the steering gear system, a planetary carrier of the first planetary gearset is connected to the first final drive, a sun gear of the first planetary gearset is connected, by way of a zero shaft, to the first hydraulic motor, and an intermediate gearwheel is provided between the sun gear of the first planetary gearset and the zero shaft for reversing a rotational direction of the first track; and
the second summation gear system comprises a second planetary gearset in which that a ring gear of the second planetary gearset is connected to the central shaft of the steering gear system, a planetary carrier of the second planetary gearset is connected to the second final drive, a sun gear of the second planetary gearset is connected, by way of the zero shaft, to the second hydraulic motor, and an intermediate gearwheel is provided between the sun gear of the second planetary gearset and the zero shaft for reversing a rotational direction of the second track.

8. The tracked vehicle according to claim 7, wherein the drive engine, the gearshift transmission and the pump are arranged adjacent the leading end of the tracked vehicle and the steering gear system and the first and the second summation gear systems are arranged adjacent the trailing end of the tracked vehicle.

9. A tracked vehicle with a drive engine for providing mechanical drive power,
a gearshift transmission being coupled to the drive engine,
a steering gear system being coupled to a final drive of a first track and a final drive of a second track,
a pump for supplying hydraulic power to first and second hydraulic motors of the steering gear system, and
the drive engine, the gearshift transmission and the pump being arranged as a drive unit which is separated from the steering gear system;
wherein the steering gear system has a first summation gear system coupled to the final drive of the first track and a second summation gear system coupled to the final drive of the second track;
the first and the second summation gear systems are arranged on the tracked vehicle adjacent a rear portion thereof;
the first summation gear system comprises a first planetary gearset in which that a ring gear of the first planetary gearset is connected to a central shaft of the steering gear system, a planetary carrier of the first planetary gearset is connected to the final drive of the first track, a sun gear of the first planetary gearset is connected, by way of a zero shaft, to the first hydraulic motor, and an intermediate gearwheel is provided between the sun gear of the first planetary gearset and the zero shaft for reversing a rotational direction of the first track; and
the second summation gear system comprises a second planetary gearset in which that a ring gear of the second planetary gearset is connected to the central shaft of the steering gear system, a planetary carrier of the second planetary gearset is connected to the final drive of the second track, a sun gear of the second planetary gearset is connected, by way of the zero shaft, to the second hydraulic motor, and an intermediate gearwheel is provided between the sun gear of the second planetary gearset and the zero shaft for reversing a rotational direction of the second track.

* * * * *